Nov. 19, 1968  P. O. GUERKE  3,411,169
CARGO RAMP ASSEMBLY

Filed Jan. 6, 1967  4 Sheets-Sheet 1

INVENTOR
PETER O. GUERKE
BY Mason, Fenwick & Lawrence
ATTORNEYS

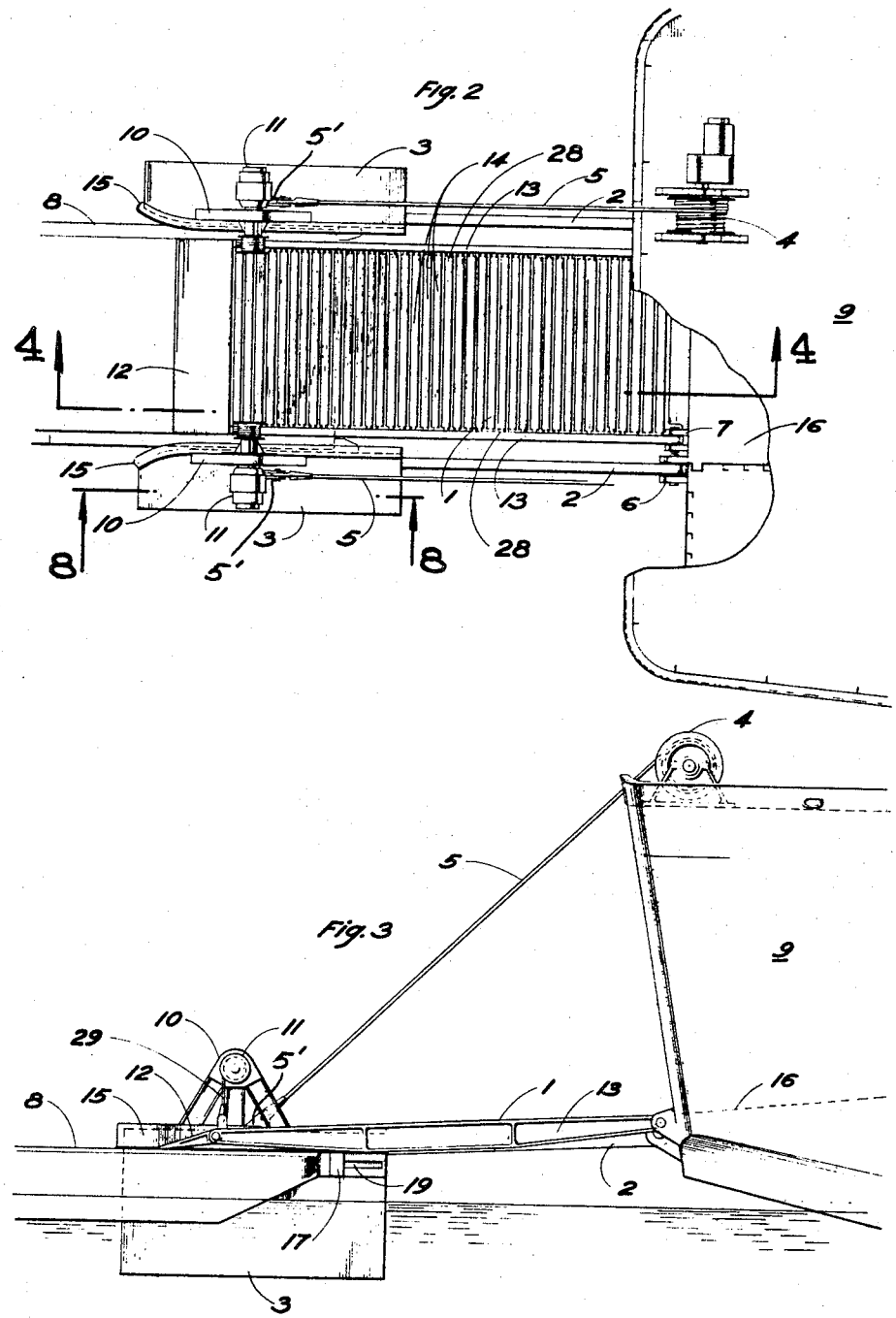

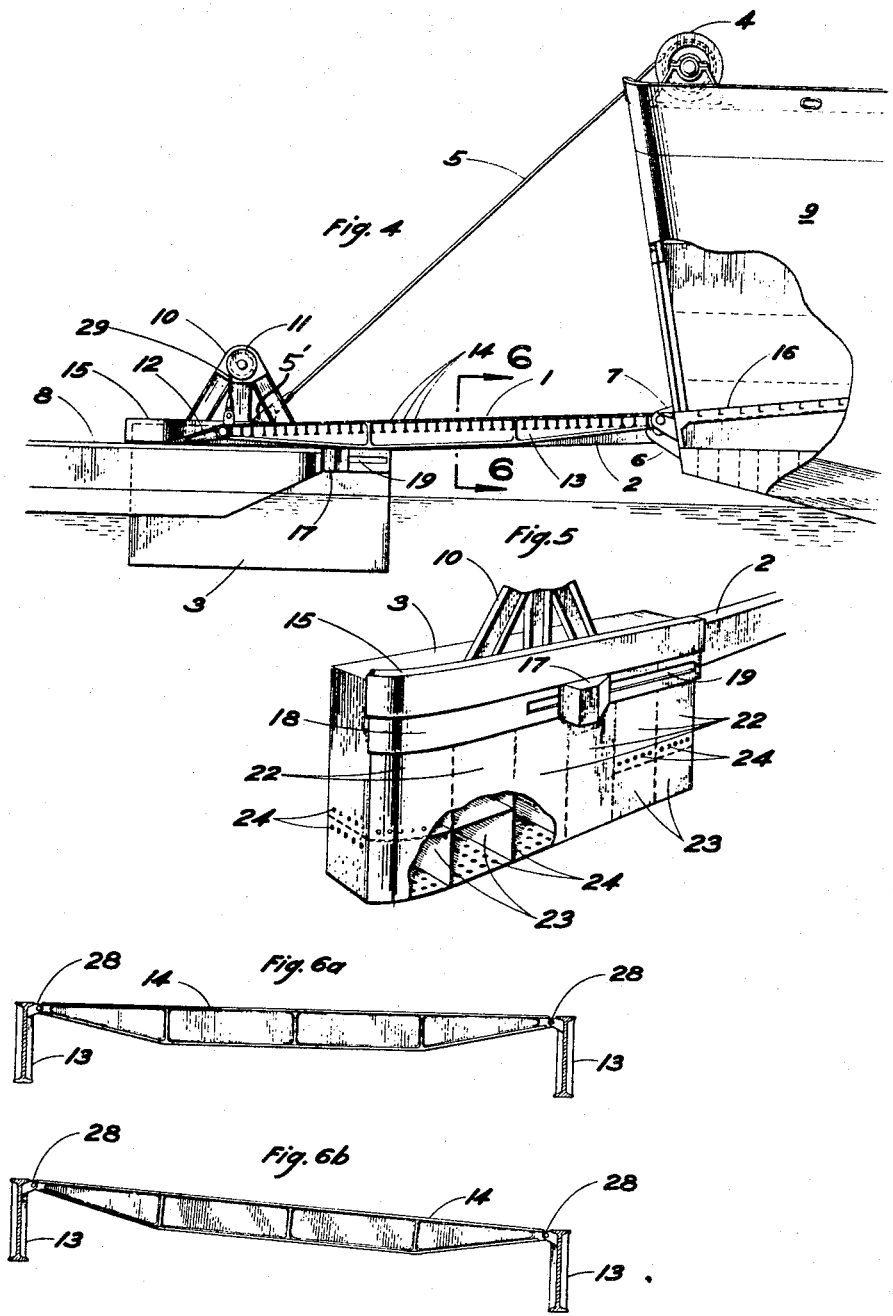

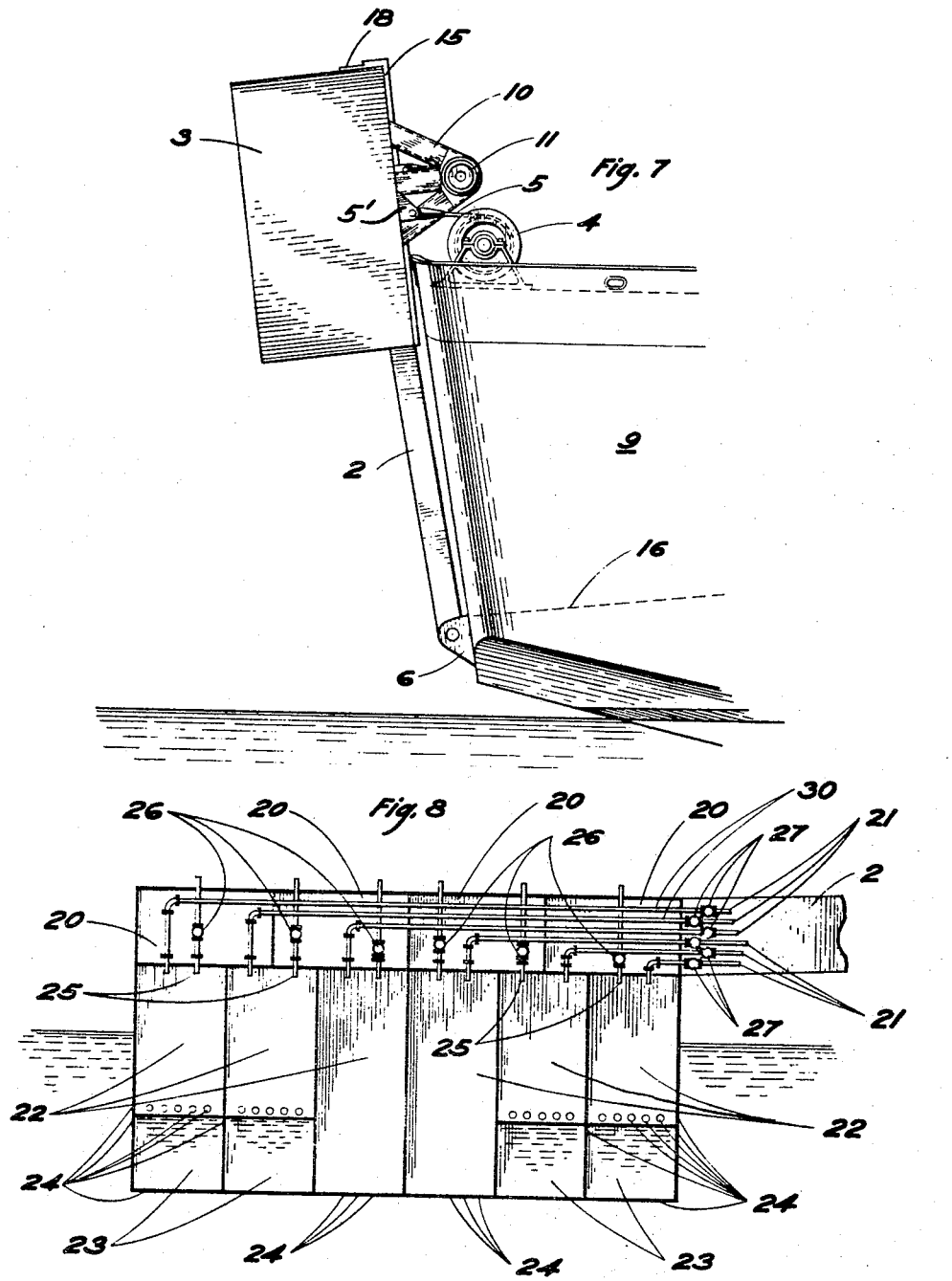

United States Patent Office 3,411,169
Patented Nov. 19, 1968

3,411,169
CARGO RAMP ASSEMBLY
Peter O. Guerke, Miami, Fla., assignor to Miami Beach Yacht Corporation, Miami Beach, Fla., a corporation of Florida
Filed Jan. 6, 1967, Ser. No. 607,675
12 Claims. (Cl. 14—71)

ABSTRACT OF THE DISCLOSURE

A ramp and float assembly for movement of cargo between two zones, especially between a ship and a lighter, having a ramp proper hinged about a transverse axis at one end, a pair of flanking booms hinged at a corresponding end and having floats of controllable buoyancy at the other end adjacent the free end of the ramp proper, automatic take-up winches controlling elevation of the booms, winches on the floats controlling elevation of the ramp proper relative to the booms and floats, and fender formations on the floats for locating engagement with portions of the lighter. The ramp proper is constructed of longitudinal beams and transverse slats pivotally coupled to the beams to facilitate twisting of the ramp.

---

The present invention relates in general to cargo loading and unloading ramps to facilitate movement of cargo to or from ships, floating lighters, or shore cargo landing facilities of various types, and has special application to ship mounted cargo handling ramps for movement of cargo to or from lighters or docks and for loading or unloading amphibious or floatable objects from or to waterborne relation.

The provision of cargo loading and unloading ramp systems which are sufficiently versatile to be suitable for ship mounted as well as shore mounted, applications, and which are appropriate for the varied conditions encountered in cargo handling operations involving floating lighters, floating ships, stationary docks and piers, and/or transfers of amphibious or floatable bodies to or from water-borne conditions, introduce a complex combination of design and capability requirements.

An object of the present invention is the provision of a loading and unloading ramp assembly which will allow loading or unloading in severe sea conditions, by permitting the lighter or ship to which the ramp is attached to roll, pitch and heave as induced by the waves.

Another object of the present invention is the provision of a novel cargo ramp structure which is hingedly connected to a ship and is constructed to prevent impact of the ramp against the deck of a floating lighter and thereby avoid resulting damage that would arise from such impact.

Another object of the present invention is the provision of a novel cargo ramp structure for use in moving cargo between a ship or a land installation and a lighter, which allows for continuous change in vertical position of the lighter in relation to the ship or the land as necessitated by the draft change of the ship due to the movement of cargo from the ship or land onto the lighter or vice versa.

Another object of the present invention is to provide a novel ship cargo ramp structure for use in moving cargo between the ship and a lighter, which allows for safe and secure connecting and disconnecting of the lighter to and from the outer end of the ramp in the same sea state during which the use of the ramp is intended.

Yet, another object of the present invention is the provision of a novel ship cargo ramp for loading and unloading purposes adaptable for the launching and hauling of floating and amphibious vehicles, such as lighters, tugs, landing craft, amphibious tanks, and the like, by providing means for lowering its outer end below the mean surface of the water and supporting it in this position to carry the load of the equipment being launched or hauled.

Another object of the present invention is the provision of a novel ship cargo ramp having support floats at the outer end thereof, for use in moving cargo between the ship and a lighter, which will change the amplitude and frequency of the lighter's motion in the existing sea state by super-imposing thereon the motion of the floats and/or adjusting the support from automatic take-up winches, also known as oceanographic winches.

Another object of the present invention is the provision of a novel ship cargo ramp for use in moving cargo between the ship and a lighter, arranged to permit variations of the fore and aft positioning of the lighter so as to allow heavy loads to be deposited on or removed from the lighter close to its center of floatation in order to avoid excessive states of longitudinal trim as experienced while loading onto or unloading from its extreme end.

Other objects, advantages and capabilities of the present invention will become apparent from the following detailed description, taken in conjunction with the accompanying drawings illustrating a preferred embodiment of the invention.

In the drawings:

FIGURE 2 is a plan view of the ship cargo ramp assembly, located on the stern of a large ship, with part of the ship cut away to more clearly show the arrangement of the ramp-to-ship connection;

FIGURE 3 is a side elevation view of the ramp assembly shown connected to the stern of a large ship with the starboard float and boom removed;

FIGURE 4 is a section view of the ramp assembly, taken along the line 4—4 of FIGURE 2;

FIGURE 5 is a fragmentary perspective view of the port side float;

FIGURE 6a is a section view of the ramp structure taken along the line 6—6 of FIGURE 4 showing the same in normal position;

FIGURE 6b is a section view taken from the same position as FIGURE 6a but illustrating the ramp in twisted position;

FIGURE 7 is a side elevation view showing the ramp assembly elevated in stored position on the stern of the ship; and, FIGURE 8 is a longitudinal section view through the float structure, taken along the line 8—8 of FIGURE 2.

Figure 1:
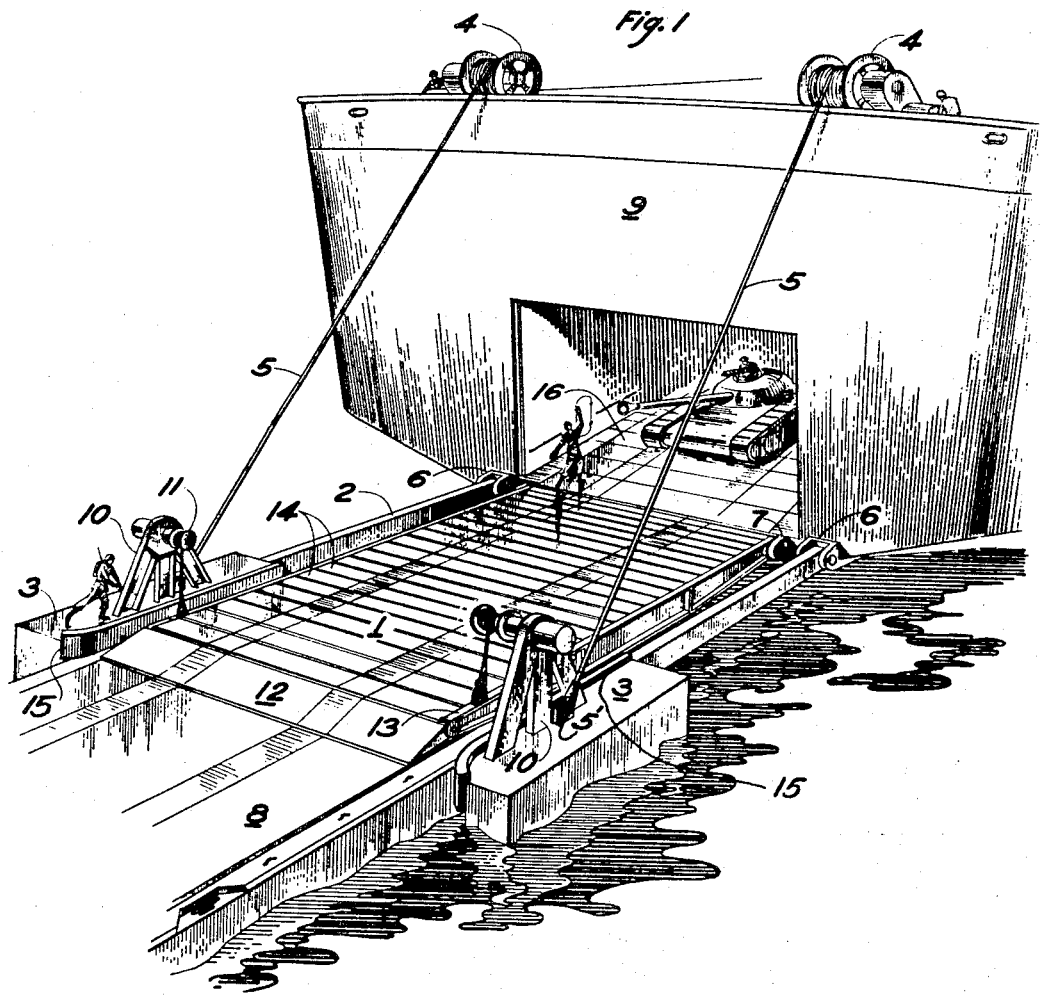
FIGURE 1 is a perspective view of a cargo ramp assembly embodying the present invention, shown in operative position on the stern of a large ship.

Referring to the drawings, wherein like reference characters designate corresponding parts throughout the several figures, the cargo loading and unloading ramp assembly comprises as the main components thereof, a ramp proper, indicated generally by the reference character 1, and a pair of elongated rigid booms 2 extending along the opposite sides of the ramp 1 in flanking relation thereto, having floats 3 rigidly affixed to the outer ends of the booms 2. The floats 3 at the outer ends of the booms 2 are movably supported relative to the associated ship 9 by conventional automatic take-up winches 4 mounted on deck of the ship having float lift cables 5 attached to the floats 3. These winches 4 are of a known type having provision for automatically reeling in any slack cable 5 to maintain at least a preselected minimum tension on the cables 5, or automatically paying out cable 5 should the tension exceed the preselected amount. The inner ends of the booms 2 are connected to the ship 9 by means of boom hinges 6 having hinge knuckle members fixed to the ship's stern establishing a horizontal transverse hinge axis for the booms 2 near the bottom of the cargo discharge opening in the stern of the ship, while the inner end of the ramp proper 1 is linked to the ship by ramp hinges 7, also having knuckle members fixed to the ship's stern, establishing a horizontal transverse hinge axis for the ramp near the hinge axis for the booms 2. The ramp itself consists of two longitudinally extending, elongated ramp girders 13 which may be, for example, of I-beam construction as illustrated in FIGURES 6a and 6b, defining the lateral longitudinal edges of the ramp proper 1, between which extend a large number of elongated narrow ramp slats 14 transversely spanning the ramp and connected by means of slat hinges 28 at each end thereof to the ramp girders 13. The inner ends of the ramp girders 13 are connected to the ramp hinges 7 at the ship 9, and the outer ends of the ramp girders 13 have pivoted thereto the ramp end flap 12 which may incline downwardly from the plane established by the upper surfaces of the ramp slats 14 to engage and rest upon the surface to which the cargo is to be transferred from the ramp or from which the cargo is to be received onto the ramp, such, for example, as the upper surface of a floating lighter 8.

The outer end of the ramp proper 1 is supported for independent adjustment relative to the floats 3 by means of a pair of ramp winches 11, one of which is provided on each of the floats 3, supported above the top deck of their associated floats by winch support structures 10 and having ramp support cables 29 attached to the outer end portion of the ramp proper 1. Each of the floats 3 also has suitable means for fastening the float lift cable 5 thereto, such as the cable anchoring members 5' shown in FIGURES 1, 2 and 7.

As is more clearly shown in FIGURE 5, each of the floats 3 has a vertical stop fender 15 along the top edge thereof at the side nearest the ramp proper 1, defining a horizontal offset shoulder along its lower edge, below which is a side fender 18, defining an inwardly facing, vertical surface, and a horizontal stop fender 17 which is adjustable longitudinally in a fore and aft direction relative to the associated float 3 along a portion of the length of the associated side fender 18 by suitable means. For example, the fender 18 may be provided with a rectilinear elongated slot 19 for receiving a portion of the horizontal stop fender 17 projecting therethrough to serve as a slide track therefor, with the stop fender 17 adjustably located longitudinally of the slot 19 by means such as a pneumatic or hydraulic cylinder unit located internally of the float 3.

The interior of each of the floats 3 is sub-divided by suitable internal partitions, as is more clearly illustrated in FIGURE 8, to provide a number of floatation cells 20 underneath the top deck of each float, as well as several controlled flooding cells 22 and a number of free flooding ballast cells 23. Suitable drain holes such as those indicated at 24 are provided in a known manner to permit selective flooding of the cells. Control of the buoyant condition of the floats 3 is achieved by vent pipes 25 regulated by remote controlled outlet valves 26, and by blow pipes 30 regulated by remote controlled compressed air valves 27 which are connected by compressed air hoses 21 to a suitable source or sources of compressed air in the ship 9.

A typical ship's inner ramp is indicated by the reference character 16 in FIGURES 1–4 and 7 to illustrate an appropriate disposition of the ramp proper 1 relative to such a ship's inner ramp.

The cargo ramp assembly of the present invention can be conveniently carried in a stored position on the stern of a ship as illustrated in FIGURE 7. When it is desired to lower the cargo ramp assembly into operative position for a cargo loading or unloading operation, the assembly is lowered from its stored position illustrated in FIGURE 7 into operating position as shown in FIGURE 1, by paying out the float support cables 5 from the automatic take-up winch or winches 4 on the ship. When the floats 3 assume a floating condition in the water, the outer or free end of ramp 1 is then hoisted to nearly its highest position relative to the floats by means of the ramp support cables 29 and the ramp winches 11, and the draft of the floats 3 is properly adjusted by flooding or blowing out one or several of the controlled flooding cells 22. This is achieved by opening the proper remote controlled outlet valves 26 to vent selected cells and achieve flooding thereof, or by closing the appropriate remote controlled outlet valves 26 and opening for the proper length of time the remote controlled compressed air valve 27 to blow out the desired flooding cells. Thereupon, the lighter 8 is moved into position between the floats 3 until its approaching movement to the ramp assembly is arrested by contact of the adjacent end of the lighter 8 against the horizontal stop fenders 17 and the adjoining lighter sides against the side fenders 18. The lighter will be held in this position either by its own propulsion plant, or, if nonpropelled, by means of a push boat or by securing it with docking lines to the floats 3.

With the lighter 8 in proper position, the air in one or more controlled flooding cells 22 in each float 3 is released by opening the corresponding remote controlled outlet valve 26 and simultaneously the float lift cables 5 are paid out from the automatic take-up winches 4 until the floats 3 have sunk down far enough to arrest with the shoulders defined by the bottom edges of the vertical stop fenders 15 on the deck of the lighter 8 at the forward side edges thereof, and this lowering of the floats 3 is continued until a sufficient portion of their weight is supported by the lighter 8 to assure a continuous connection between the lighter 8 and the floats 3 without any separation due to the existing sea state. It is now possible to influence the frequency and amplitude of the motion of the lighter 8 by changing the amount of load imposed on it by the floats 3 as well as by changing the ratio between the forces exerted by the remaining buoyancy of the floats 3 and the tension of the automatic take-up winches 4 which support the remainder of weight of floats 3 which includes part of the weight of the ramp 1 supported from the floats 3 by the ramp support cables 29.

To start the loading or unloading operation, the ramp proper 1 is now lowered into position by paying out the ramp support cables 29 from the ramp winches 11 on the floats 3 until the ramp end flap 12 rests on the deck of the lighter 8, without the ramp structure itself being in contact with the lighter 8. If now, during the loading or unloading operation, the lighter 8 is lifted by a passing wave, so are the floats 3. However, since the floats 3 do not float on their natural water line, but receive part of their buoyancy from the lighter 8, this upward motion will be delayed. This means that the floats 3 will stay in firm contact with the lighter 8. Since the ramp structure 1 is supported from the floats 3 by means of the ramp support cables 29, the ramp winches 11, and the winch supports 10, the ramp 1 will be lifted simultaneously with the floats and maintain substantially the previously established spacing between the ramp 1 and the deck of the lighter 8, and, therefore, no impact between the ramp and the lighter can take place. As the floats 3 move upwardly, the slackened float lift cables 5 will automatically be reeled into an appropriate extent by the automatic take-up winches 4. As the upward motion on the entire assembly comes to an end, the tension imposed on the float lift cables 5 by the automatic take-up winches 4 will be at its minimum. Therefore, a greater portion of the remaining float weight is resting on the lighter 8 than in the rest position, thus dampening the motion of the lighter.

Reversely, when the lighter 8 moves downwardly, the floats 3 also move downwardly, drawing off of the winches 4 cable which had been reeled thereon during the upward movement of the float 3 and consequent slackening of the cables 5, except that, being short on buoyancy of their own, the floats 3 try to descend faster than the lighter 8, thus again staying in firm contact with the lighter 8 by means of the vertical stop fender 15. As the downward motion nears its end, the tension in the float lift cables 5 increases, which results in a reduction of the load placed upon the lighter 8. Thus again, the motion of the lighter 8 is dampened.

As the draft of the lighter 8 increases during the loading operation, the load imposed on it by the floats 3 is maintained at the desired level by additional flooding of the controlled flooding cells 22 and simultaneous paying out of the float lift cables 5 from the automatic take-up winches 4. In case of an unloading operation from the lighter 8 onto the ship 9, the draft of the lighter 8 will decrease and the load imposed on it by the float will be adjusted by blowing air into the controlled floatation cells 22 through the blow pipes 30 and the remote controlled compressed air valves 27, as well as by simultaneous reeling in of the float support cables 5 by the automatic take-up winches 4.

In case of a draft and/or trim change of the ship 9, due to the loading or unloading over the ramp 1 or elsewhere, the angle of the entire ramp and boom assembly in relation to the ship 9 may be adjusted as desired by the float lift cables 5.

If the cargo to be loaded onto or unloaded from the ship 9 consists of amphibious type vehicles, the entire ramp and float assembly is lowered from its stored position into the operating position, as described before. Then the ramp 1 is further lowered by means of the ramp support cables 29 and the ramp winches 11 until its outer or free end, carrying the ramp end flap 12, is sufficiently submerged below the surface of the water. The floats 3 are adjusted for near maximum free-board to provide enough buoyancy to support the weight of the vehicles when near the end of the ramp 1.

With respect to the capacity of the cargo ramp assembly to accommodate to twisting forces, as the lighter 8 moves up and down in accordance with the existing waves, it also rolls from side to side. It will, therefore, induce an upward motion on the float 3 on one side of the ramp assembly and a downward motion on the float 3 on the other side, or the float on one side of the assembly may advance up or down faster and/or further than the float at the other side. At the same time, the ship 9 may experience a rolling motion, which for reasons of the difference in size between the ship 9 and the lighter 8, will be of different amplitude and frequency. Since, as has been heretofore explained, the outer corners of the ramp proper 1 are supported by the floats 3 in such a way that the lighter 8 does not come into direct contact with the ramp structure 1, it is obvious that the ramp 1 must be capable of twisting; that is, it must be able to attain a different attitude relative to the horizontal plane at the outer or free end of the ramp 1 relative to the attitude of the inner or hinged end of the ramp. By reason of the fact that the transversely extending ramp slats 14 are connected to the longitudinally extending ramp girders 13 by the slat hinges 28, either of the longitudinal girders 13 may at any point along its length be higher or lower than the opposite girder 13, with the angle of the ramp slats 14 relative to the horizontal increasing or decreasing from slat to slat, so that the innermost and outermost slats 14 include between them the total amount of twist required by the motion of the lighter 8 and/or the motion of the ship 9.

The cargo ramp structure is also readily adaptable to use in loading or unloading cargo to or from the ship 9 over the ramp 1 from or onto a stationary pier or dock. In this case, after properly positioning the ship 9 relative to the dock, the floats 3 are left secured in their stored position illustrated in FIGURE 7, and the ramp proper 1 only is lowered onto the pier or dock by paying out the ramp support cables 29 from the ramp winches 11 until the outer end of the ramp firmly rests on the dock and the ramp support cables 29 are slack. Again, it is now possible for the ship 9 to heave, pitch, and roll as well as change its draft due to loading or unloading operations in the manner previously described.

It will be apparent also that the herein described cargo ramp assembly may be employed with equal facility when the ramp and float assembly is hinged from a fixed shore structure, rather than being hinged to a ship, and is used to load or unload cargo between the shore and ships or lighters.

While but one preferred embodiment of the present invention has been specifically shown and described, it will be apparent that various modifications may be made therein within the spirit and scope of the invention, and it is desired, therefore, that only such limitations be placed thereon as are imposed by the prior art and set forth in the appended claims.

What is claimed:

1. A cargo ramp assembly for loading and unloading of cargo including amphibious bodies, floatable bodies, and the like, between a mounting platform for the cargo assembly and a selected receiving station for the cargo, comprising a cargo ramp structure, defining a flat upwardly facing load bearing surface for transportation of the cargo thereon along a transport axis between a hinge end adjacent said platform and a free end adqacent said station, hinge means pivotally mounting said hinge end of said ramp structure to said mounting platform for arcuate movement about a generally horizontal pivot axis transverse to said transport axis through a range of angular positions between selected elevated and lowered positions, a pair of elongated booms extending in laterally flanking relation to said ramp structure along opposite sides thereof each having a corresponding first end hingedly mounted to said mounting platform for arcuate movement about a boom hinge axis parallel to said pivot axis and having float means of controllable buoyancy secured to the outer ends of said booms remote from said first ends thereof, first elevation control means coupled between said booms and said mounting platform for varying the angular position of said booms about said boom hinge axis, and second elevation control means coupled between said float means and said ramp structure for varying the angular position of said ramp structure about said pivot axis relative to said booms.

2. A cargo ramp assembly as defined in claim 1, wherein said booms are independently movable about their respective boom hinge axes and said ramp structure comprises a pair of elongated rigid side beam members extending the length thereof each hinged at a corresponding end thereof by said hinge means to said mounting platform, and a plurality of narrow elongated slat members spanning said ramp transversely between said beam members and disposed in side-by-side relation to collectively define said load bearing surface, said slat members being each hingedly connected at their opposite ends to said beam members along pivot axes extending radially of said pivot axis of said ramp structure to provide plural perpendicular related pivot axes permitting twisting movement of the ramp structure upon movement of said booms to different respective positions about said boom axes.

3. A cargo ramp assembly as defined in claim 2, wherein said second elevation control means comprises a pair of power driven winches supported on the respective floats having cables connected with respective adjacent sides of said ramp structure near the free end thereof for independently adjusting the elevation of said free end through a range of distances relative to said floats.

4. A cargo ramp assembly as defined in claim 3, wherein said first elevation control means comprises a pair of automatic take-up winches mounted on said mounting platform having load suspension cables connected to said booms in the region of said floats for elevating and lowering said booms through a range of angular positions about their boom hinge axes.

5. A cargo ramp assembly as defined in claim 1, wherein said second elevation control means comprises a pair of power driven winches supported on the respective floats having cables connected with respective adjacent sides of said ramp structure near the free end thereof for independently adjusting the elevation of said free end through a range of distances relative to said floats.

6. A cargo ramp assembly as defined in claim 5, wherein said first elevation control means comprises a pair of automatic take-up winches mounted on said mounting platform having load suspension cables connected to said booms in the region of said floats for elevating and lowering said booms through a range of angular positions about their boom hinge axes.

7. A cargo ramp assembly as defined in claim 4, wherein said mounting platform is a ship, said hinge means for said ramp structure and said hingedly mounted first ends of said booms being mounted on said ship, and said floats having a plurality of flooding cells and pneumatic control means for selectively flooding and blowing out said flooding cells to adjust the buoyancy condition thereof to various selected drafts.

8. A cargo ramp assembly as defined in claim 1, wherein said mounting platform is a ship, said hinge means for said ramp structure and said hingedly mounted first ends of said booms being mounted on said ship, and said floats having a plurailty of flooding cells and pneumatic control means for selectively flooding and blowing out said flooding cells to adjust the buoyancy condition thereof to various selected drafts.

9. A cargo ramp assembly as defined in claim 7, wherein said said floats each have a vertical fender on the confronting surfaces thereof each defining a downwardly facing stop shoulder adapted to abut on an upwardly facing deck surface of a floating lighter to position the booms and floats with the outer end portions of the booms supported by the lighter and said flooding cells being regulated to adjust the floats to a buoyancy condition imposing a selected portion of their weight on said lighter.

10. A cargo ramp assembly as defined in claim 8, wherein said floats each have a vertical fender on the confronting surfaces thereof each defining a downwardly facing stop shoulder adapted to abut on an upwardly facing deck surface of a floating lighter to position the booms and floats with the outer end portions of the booms supported by the lighter and said flooding cells being regulated to adjust the floats to a buoyancy condition imposing a selected portion of their weight on said lighter.

11. A cargo ramp assembly as defined in claim 1 wherein said floats each have a vertical fender on the confronting surfaces thereof each defining a downwardly facing stop shoulder adapted to abut on an upwardly facing deck surface of a floating lighter to position the booms and floats with the outer end portions of the booms supported by the lighter.

12. A cargo ramp assembly as defined in claim 11, wherein said floats each include a stop member defining an abutment shoulder engageable with an end of the lighter and means for moving said stop member through a range of positions along the direction of said transport axis on each float to locate the floats and the free end of said ramp structure in selected positional relation to the lighter.

References Cited

UNITED STATES PATENTS

| | | | |
|---|---|---|---|
| 2,336,140 | 12/1943 | Vogler | 61—48 |
| 2,715,314 | 8/1955 | Smith | 61—48 |
| 3,004,391 | 10/1961 | Miller | 14—71 XR |
| 3,069,862 | 12/1962 | Ward | 14—71 XR |
| 3,274,629 | 9/1966 | Gearon et al. | 14—71 |

FOREIGN PATENTS 529,888    7/1931    Germany.

JACOB L. NACKENOFF, *Primary Examiner.*